United States Patent
Mizukoshi et al.

(10) Patent No.: US 11,312,006 B2
(45) Date of Patent: Apr. 26, 2022

(54) ROBOT DRIVE UNIT AND ROBOT

(71) Applicant: FANUC CORPORATION, Yamanashi (JP)

(72) Inventors: Tomoaki Mizukoshi, Yamanashi (JP); Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/060,482

(22) Filed: Oct. 1, 2020

(65) Prior Publication Data

US 2021/0016432 A1 Jan. 21, 2021

Related U.S. Application Data

(63) Continuation-in-part of application No. 16/251,403, filed on Jan. 18, 2019, now Pat. No. 10,840,758.

(30) Foreign Application Priority Data

Mar. 30, 2018 (JP) .............................. JP2018-067890

(51) Int. Cl.
- *B25J 9/04* (2006.01)
- *B25J 9/10* (2006.01)
- *F16C 33/76* (2006.01)
- *B25J 17/00* (2006.01)
- *B25J 19/00* (2006.01)

(52) U.S. Cl.
CPC ................ *B25J 9/04* (2013.01); *B25J 9/108* (2013.01); *B25J 17/00* (2013.01); *F16C 33/768* (2013.01); *B25J 19/0029* (2013.01); *F16C 2322/59* (2013.01)

(58) Field of Classification Search
CPC ...... B25J 19/0029; B25J 19/0075; H02K 1/28
See application file for complete search history.

(56) References Cited

U.S. PATENT DOCUMENTS

| 4,678,952 A |  | 7/1987 | Peterson et al. |
|---|---|---|---|
| 4,708,580 A | * | 11/1987 | Akeel ................. B25J 19/0029 277/412 |
| 4,904,148 A | * | 2/1990 | Larsson ..................... B25J 9/04 414/680 |

(Continued)

FOREIGN PATENT DOCUMENTS

| EP | 0 658 405 A1 | 6/1995 |
|---|---|---|
| EP | 2190104 A1 | 5/2010 |

(Continued)

OTHER PUBLICATIONS

Office Action dated Jun. 30, 2020, in corresponding Japanese Application No. 2018-067890, 11 pages.

(Continued)

*Primary Examiner* — David M Fenstermacher
(74) *Attorney, Agent, or Firm* — Maier & Maier, PLLC

(57) ABSTRACT

A robot drive unit is provided with: a housing; a shaft body that is relatively rotated with respect to the housing; rotating-body sealing members that is provided in the housing; a contact-surface member that is provided on the shaft body and that contact with the rotating-body sealing members; and a sealing member that seals a gap between the shaft body and the contact-surface member.

20 Claims, 5 Drawing Sheets

(56) References Cited

U.S. PATENT DOCUMENTS

| | | | |
|---|---|---|---|
| 5,065,062 A * | 11/1991 | Uehara | B25J 19/0079 |
| | | | 310/114 |
| 5,606,235 A | 2/1997 | Mauletti | |
| 5,732,599 A * | 3/1998 | Iriyama | B25J 17/0241 |
| | | | 74/490.02 |
| 7,422,412 B2 | 9/2008 | Akaha | |
| 7,704,036 B2 | 4/2010 | Sato | |
| 7,878,088 B2 | 2/2011 | Tamura et al. | |
| 2005/0072275 A1 | 4/2005 | Sasaki et al. | |
| 2005/0111940 A1* | 5/2005 | Markert | B25J 19/0075 |
| | | | 414/314 |
| 2006/0104792 A1* | 5/2006 | Giuliano | B05B 13/0431 |
| | | | 414/744.3 |
| 2008/0148895 A1* | 6/2008 | Palau | B25J 19/0029 |
| | | | 74/490.02 |
| 2010/0043587 A1 | 2/2010 | Broberg et al. | |
| 2010/0107814 A1 | 5/2010 | Tominaga et al. | |
| 2012/0111135 A1 | 5/2012 | Ichibangase et al. | |
| 2014/0020498 A1 | 1/2014 | Adachi | |
| 2014/0290416 A1* | 10/2014 | Demura | B25J 19/0025 |
| | | | 74/490.02 |
| 2014/0360307 A1 | 12/2014 | Takahashi et al. | |
| 2015/0068350 A1 | 3/2015 | Kirihara et al. | |
| 2015/0135880 A1* | 5/2015 | Zaruba | B25J 19/0075 |
| | | | 74/490.01 |
| 2016/0193735 A1 | 7/2016 | Krumbacher | |
| 2017/0072573 A1* | 3/2017 | Motokado | B25J 17/0283 |
| 2017/0361471 A1* | 12/2017 | Groll | F16J 15/3228 |
| 2018/0038446 A1 | 2/2018 | Nakayama et al. | |
| 2019/0299424 A1* | 10/2019 | Curhan | B25J 15/10 |
| 2019/0305618 A1* | 10/2019 | Mizukoshi | B25J 9/0009 |
| 2019/0353226 A1 | 11/2019 | Nakayama et al. | |
| 2020/0338718 A1* | 10/2020 | Oowaki | B25J 9/0009 |
| 2021/0308873 A1* | 10/2021 | Furstenberger | B25J 19/0075 |

FOREIGN PATENT DOCUMENTS

| | | |
|---|---|---|
| EP | 2450158 A1 | 5/2012 |
| JP | S60-81280 U | 6/1985 |
| JP | S63-077677 A | 4/1988 |
| JP | H03-185122 A | 8/1991 |
| JP | H06-114786 A | 4/1994 |
| JP | H07-205065 A | 8/1995 |
| JP | H08-197482 A | 8/1996 |
| JP | H08-233112 A | 9/1996 |
| JP | H11-336676 A | 12/1999 |
| JP | 2000-337392 A | 12/2000 |
| JP | 2005-103728 A | 4/2005 |
| JP | 2005-188748 A | 7/2005 |
| JP | 2006-090369 A | 4/2006 |
| JP | 2006-183852 A | 7/2006 |
| JP | 2009-18371 A | 1/2009 |
| JP | 2009-90381 A | 4/2009 |
| JP | 2012-96332 A | 5/2012 |
| JP | 5263162 B2 | 8/2013 |
| JP | 2014-18929 A | 2/2014 |
| JP | 2014-097573 A | 5/2014 |
| JP | 2018-020422 A | 2/2018 |

OTHER PUBLICATIONS

Japanese Office Action dated Apr. 7, 2020, in connection with corresponding JP Application No. 2018-067890 (10 pgs., including machine-generated English translation).

Japanese Search Report dated Mar. 25, 2020, in connection with corresponding JP Application No. 2018-067890 (88 pgs., including machine-generated English translation).

Musashi Oil Sealmfg. Co., Ltd., "MUSASHI oil seal product brochure", p. 15; 3 pages including Machine-Generated English-Language Translation.

* cited by examiner

ROBOT DRIVE UNIT AND ROBOT

CROSS-REFERENCE TO RELATED APPLICATIONS

This application is a continuation-in-part of U.S. patent application Ser. No. 16/251,403, filed Jan. 18, 2019, which is based on Japanese Patent Application No. 2018-067890, filed Mar. 30, 2018, the contents of which are incorporated herein by reference.

FIELD

The present invention relates to a robot drive unit and a robot.

BACKGROUND

In the related art, there is a known hollow actuator that is disposed between two relatively rotating members and that is formed to be hollow in order to deal with a cable in a mechanism of a robot (for example, see Publication of Japanese Patent No. 5263162).

In the hollow actuator of Publication of Japanese Patent No. 5263162, a motor and a speed reducer are coaxially arranged side by side in a direction along a central axis, a harmonic drive gear speed reducer, which easily forms a hollow structure, is adopted as a speed reducer, and a hollow shaft that is driven rotationally about the central axis is used as a shaft that transmits a turning force of the motor to an input axis of the speed reducer. According to the hollow shaft, a radially inner space thereof is used as a space for routing a cable etc., and can be easily partitioned from a speed reducer space that is located at a radially outer side of the hollow shaft and in which grease is enclosed. Because the hollow shaft needs to have such strength as to transmit power, it is made of a metal having high strength, such as iron.

SUMMARY

According to one aspect, the present invention provides a robot drive unit including: a housing; a shaft body that is relatively rotated with respect to the housing; rotating-body sealing members that is provided in the housing; a contact-surface member that is provided on the shaft body and that contact with the rotating-body sealing members; and a sealing member that seals a gap between the shaft body and the contact-surface member. In the above-described aspect, the rotating-body sealing members may seal the gap while allowing relative rotation of the shaft body with respect to the housing.

The above-described aspect may further include a bearing that supports the shaft body so as to be rotatable with respect to the housing.

In the above-described aspect, the bearing may be disposed at such a position as to overlap with at least part of the contact-surface member in a direction along an axis of the shaft body.

In the above-described aspect, the contact-surface member may be formed into a cylinder shape so as to cover the entire circumference of part of an outer circumferential surface of the shaft body in a direction along an axis of the shaft body.

In the above-described aspect, the sealing member may seal a gap between an inner circumferential surface of the contact-surface member and the outer circumferential surface of the shaft body. In the above-described aspect, a plurality of the sealing members may be arranged in the direction of the axis.

In the above-described aspect, the contact-surface member may be formed into a cylinder shape and may be disposed at a position so as to extend the distal end of the shaft body in a direction along the axis.

In the above-described aspect, the inner circumferential surface of the contact-surface member may be covered with a covering member that is made of a high-molecular compound.

In the above-described aspect, the shaft body may be made of a non-ferrous material, and the non-ferrous material is a material lighter than iron. The shaft body may be formed to be hollow.

The contact-surface member may be fixed to the shaft body so as not to move in a longitudinal direction of the shaft body with respect to the shaft body.

According to another aspect, the present invention provides a robot including: a first member and a second member that are relatively rotated about an axis of the shaft body; and one of the above-described robot drive units, which rotationally drives the second member relatively to the first member.

According to another aspect, the present invention provides a assembling method of a robot drive unit including a robot drive unit comprising a housing, a shaft body that is relatively rotated with respect to the housing, rotating-body sealing members that is provided in the housing, a contact-surface member that is provided on the shaft body and that contact with the rotating-body sealing members, and a sealing member that seals a gap between the shaft body and the contact-surface member, wherein the contact-surface member connected to the shaft body is integrally inserted into the rotating-body sealing members with the shaft body.

DETAILED DESCRIPTION OF EMBODIMENTS

Figure 1:
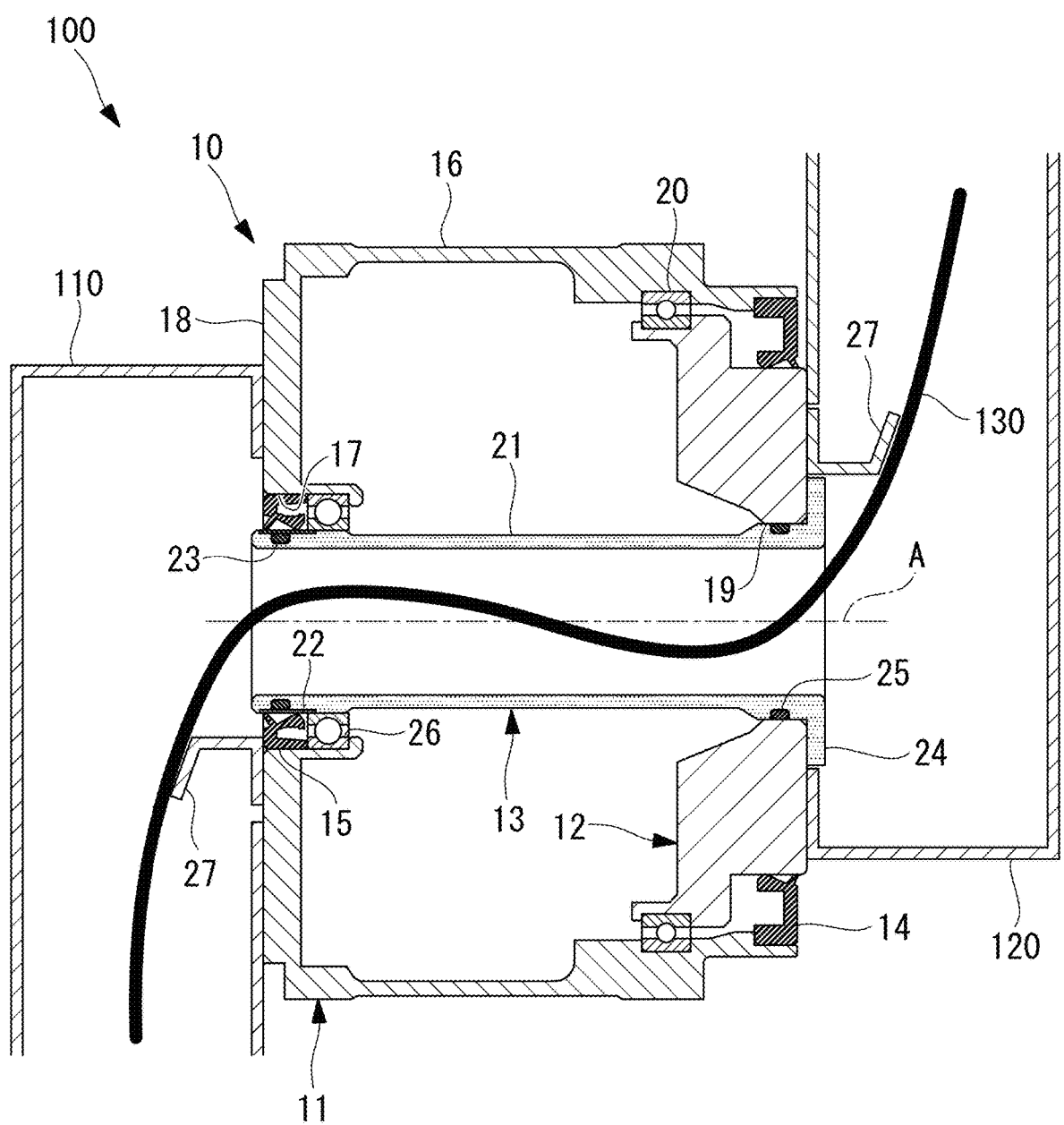
FIG. 1 is a partial longitudinal sectional view showing a robot drive unit and a robot according to one embodiment of the present invention.

A robot drive unit 10 and a robot 100 according to one embodiment of the present invention will be described below with reference to the drawings. As shown in FIG. 1, the robot 100 of this embodiment is provided with: a hollow first member 110; a hollow second member 120 that is supported so as to be capable of rotating about a predetermined axis A with respect to the first member 110; and the robot drive unit 10 of this embodiment, which rotationally drives the second member 120 with respect to the first member 110.

The robot drive unit 10 is provided with: a housing 11 that is fixed to the first member 110; an output shaft member 12 that is supported inside the housing 11 so as to be capable of rotating about the axis A and that is fixed to the second member 120; a hollow shaft 13 that is fixed to the output shaft member 12 and that is supported by the housing 11 so as to be rotatable; a first sealing member (rotating-body sealing member) 14 that seals a gap between the housing 11 and the output shaft member 12; and a second sealing member (rotating-body sealing member) 15 that seals a gap between the housing 11 and the hollow shaft 13.

The housing 11 is provided with: a tubular outer periphery 16; and an end plate 18 that extends radially inward from one end of the outer periphery 16 in the direction of the axis A and that has, at the center thereof, a through-hole 17 that penetrates therethrough in the direction along the axis A. The output shaft member 12 is formed into a circular ring-plate-like shape that has, at the center thereof, a through-hole 19 penetrating therethrough in the thickness direction and is rotatably supported by a bearing 20, on an inner circumferential surface of the outer periphery 16 of the housing 11 at the other end of the outer periphery 16.

The hollow shaft 13 is provided with: a cylindrical shaft body 21 that is made of a non-ferrous material, such as a resin or a light metal, e.g., aluminum; and a cylindrical collar (contact-surface member) 22 that is fitted at such a position as to cover part of an outer circumferential surface of the shaft body 21 located at one end thereof. The collar 22 is made of a material having a higher surface hardness than the shaft body 21, e.g., iron. It is preferred that the surface hardness of the collar 22 be HRC30 or higher.

The shaft body 21 and the collar 22 are frictionally integrated, and a sealing member 23, such as an O-ring, is disposed between the shaft body 21 and the collar 22 so as to seal the fitting surfaces thereof. For the shaft body 21 and the collar 22, the size of the outer diameter of the shaft body 21, the size of the inner diameter of the collar 22, and the size of the thickness of the collar 22 are precisely managed, thereby setting a small coaxiality tolerance between the shaft body 21 and the outer surface of the collar 22.

Figure 2:
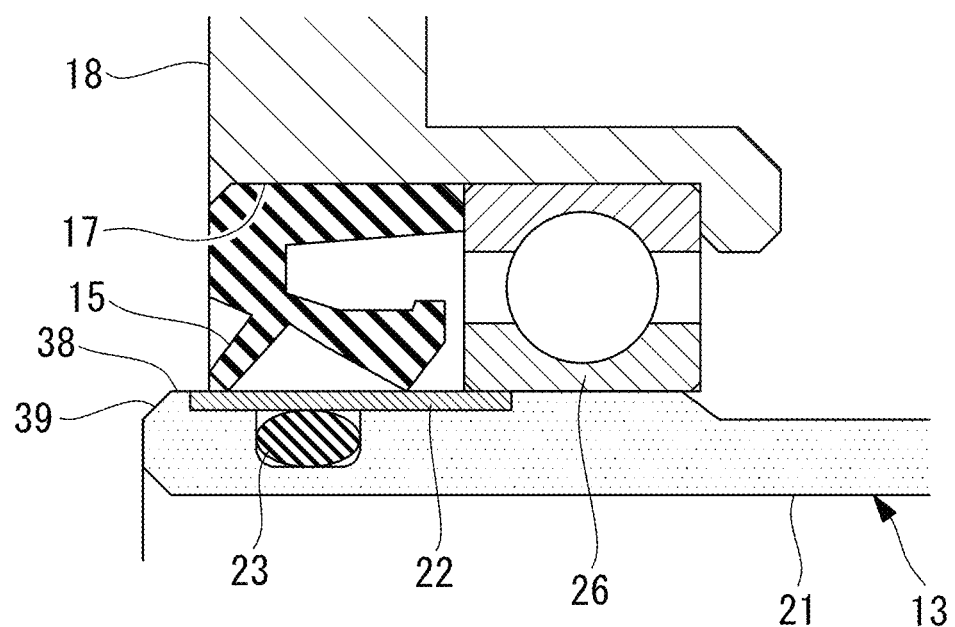
FIG. 2 is a partial longitudinal sectional view showing, in an enlarged manner, a distal end section of a hollow shaft in the robot drive unit shown in FIG. 1.

As shown in FIG. 2, a large-diameter section 38 that is slightly larger than the size of the inner diameter of the collar 22 and a tapered surface 39 that is tapered from the large-diameter section 38 toward the distal end of the shaft body 21 are provided at a distal end section of the shaft body 21. Accordingly, when the collar 22 is fitted onto the shaft body 21 from the distal end of the shaft body 21, the assembly can be easily performed by a so-called snap-fit method, in which the diameter of the large-diameter section 38 is reduced due to elastic deformation and is expanded due to an elastic restoring force of the shaft body 21 at the completion of the fitting.

A flange section 24 that extends radially outward is provided at the other end of the shaft body 21. In a state in which the shaft body 21 is fitted into the through-hole 19 of the output shaft member 12, the flange section 24 is made to abut against an end surface of the output shaft member 12 in the axial direction, and the hollow shaft 13 is fixed to the output shaft member 12 by means of bolts (not shown). The fitting surfaces between the hollow shaft 13 and the output shaft member 12 are sealed by a sealing member 25, such as an O-ring.

As shown in FIGS. 1 and 2, the second sealing member 15 is disposed between an inner surface of the through-hole 17 in the end plate 18 of the housing 11 and one end of the hollow shaft 13. A bearing 26 that supports the hollow shaft 13 so as to be rotatable about the axis A with respect to the housing 11 is disposed at a position, adjacent to the second sealing member 15, on the side close to the base end of the hollow shaft 13 in the direction along the axis A. The bearing 26 is disposed at a position where part of the collar 22 is in contact with the inner circumferential surface of an inner ring of the bearing 26. Specifically, the bearing 26 and the collar 22 are disposed in such a positional relationship as to overlap in the direction along the axis A.

Accordingly, a ring-shaped space surrounded by the housing 11, the output shaft member 12, and the hollow shaft 13 is sealed by the first sealing member 14 and the second sealing member 15 while allowing rotation of the output shaft member 12 and the hollow shaft 13 with respect to the housing 11. A speed reduction mechanism (not shown) that transmits a driving force from a motor (not shown) to the output shaft member 12 while reducing the speed is disposed in this sealed space. The speed reduction mechanism is lubricated with a lubricant. The motor is installed on an outer side of the end plate 18, for example, and a motor shaft is inserted into the inside of the sealed space by penetrating the end plate 18 in the thickness direction.

The hollow shaft 13 is disposed at a position so as to extend across the end plate 18, which is located at one end of the housing 11, and the output shaft member 12, which is located at the other end of the housing 11, and the inner space of the hollow shaft 13 penetrates the robot drive unit 10 in the direction along the axis A and is open at both ends thereof. Accordingly, the inner space of the hollow shaft 13 communicates with an inner space of the first member 110 and an inner space of the second member 120, and, as shown in FIG. 1, by using the inner space of the hollow shaft 13, a wire-shaped body 130, such as a cable, that has been guided in the first member 110 can be made to pass therethrough near the axis A and can be routed to the inside of the second member 120. In the figure, reference sign 27 denotes fixing brackets for fixing the wire-shaped body 130 to the first member 110 and the second member 120.

The operation of the thus-configured robot drive unit 10 and robot 100 of this embodiment will be described below. According to the robot drive unit 10 of this embodiment, the hollow shaft 13 can form a space for allowing the wire-shaped body 130 to pass in the vicinity of the axis A, which is the center of rotation of the output shaft member 12 with respect to the housing 11.

The wire-shaped body 130 passing through this space is merely twisted mainly by rotation and is not subjected to large repetitive bending, thus being maintained in a durably sound state.

In this case, according to this embodiment, the hollow shaft 13 is made of a non-ferrous material, thereby making it possible to achieve significant weight reduction, compared with a case in which the hollow shaft 13 is made of iron.

In particular, in this embodiment, because the hollow shaft 13 defines the ring-shaped space, in which the speed reduction mechanism and the lubricant are mainly enclosed, and does not need to transmit a torque, high mechanical strength is not required. Therefore, there is no problem regarding strength even if the hollow shaft 13 is made of a non-ferrous material having low strength.

Because the shaft body 21 is supported by the bearing 26 so as to be rotatable with respect to the end plate 18 of the housing 11, even if the shaft body 21 is made of a non-ferrous material having low mechanical strength, a core shift due to the rotation of the hollow shaft 13 is suppressed.

Therefore, a change in the sealing surface of the second sealing member 15, which is disposed adjacent to the bearing 26, is suppressed, thus making it possible to stably maintain a sealed state.

Then, according to this embodiment, because the collar 22, which is made of a material having a higher surface hardness than the shaft body 21, is disposed on the outer circumferential surface of the shaft body 21 at the distal end thereof, and the second sealing member 15 is disposed between the outer surface of the collar 22 and the through-hole 17, there is an advantage in that it is possible to prevent wear and to durably maintain the sealed state between the collar 22 and the second sealing member 15, compared with a case in which the second sealing member 15 is directly brought into contact with the surface of the shaft body 21.

According to the robot 100 of this embodiment, the housing 11 is fixed to the first member 110, and the second member 120 is fixed to the output shaft member 12, thereby making it possible to guide the wire-shaped body 130, which is routed via the inside of the first member 110, to the inside of the second member 120 via the inner space of the hollow shaft 13. Accordingly, the wire-shaped body 130 can be laid without being exposed to the outside.

Then, even when the second member 120 is rotated about the axis A with respect to the first member 110 through actuation of the robot drive unit 10, the wire-shaped body 130, which is laid inside, need not be subjected to a large repetitive bending stress, thus making it possible to durably operate the robot 100. The shaft body 21 is made of a flexible material, such as a resin, thereby making it possible to reduce wear caused by the friction between the wire-shaped body 130 and the shaft body 21 and to maintain the soundness of the wire-shaped body 130. By reducing the weight of the robot drive unit 10, there is also an advantage in that weight reduction of the robot 100 itself can be achieved.

Figure 3:
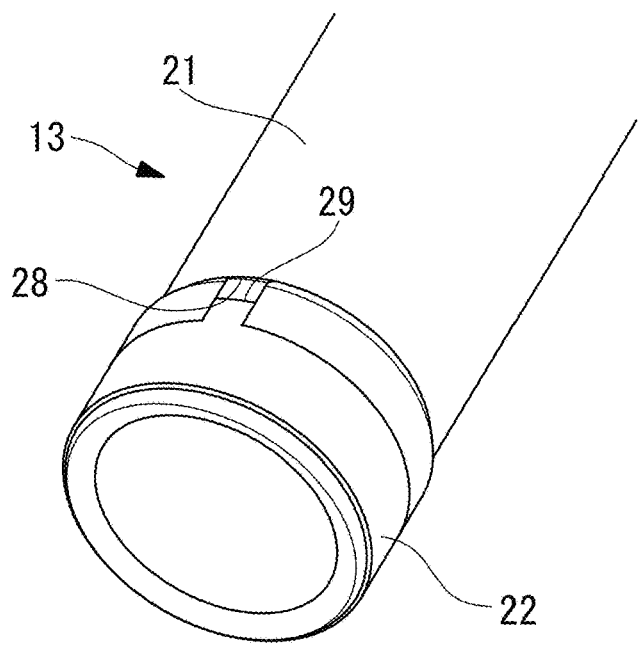
FIG. 3 is a perspective view showing a distal end section of a hollow shaft according to a modification of the robot drive unit shown in FIG. 1.

In this embodiment, although the shaft body 21 and the collar 22 are integrally operated due to the friction therebetween, instead of this, as shown in FIG. 3, it is also possible to provide a recessed section 28 in the shaft body 21 and to provide, in the collar 22, a protruding section 29 to be engaged with the recessed section 28 in the circumferential direction. The shaft body 21 and the collar 22 can be integrally rotated about the axis A through engagement of the recessed section 28 and the protruding section 29.

In order to perform the engagement of the recessed section 28 and the protruding section 29 with no space, the protruding section 29 of the collar 22 may be engaged with the recessed section 28 while elastically deforming the recessed section 28, which is provided in the shaft body 21, so as to expand in a circumferential direction. It is also possible to provide the protruding section 29 in the shaft body 21 and to provide the recessed section 28 in the collar 22. In this case, while elastically deforming the protruding section 29, which is provided in the shaft body 21, so as to contract in a circumferential direction, the protruding section 29 is engaged with the recessed section 28 of the collar 22. Two or more protruding sections 29 and two or more recessed sections 28 may also be provided.

Figure 4:
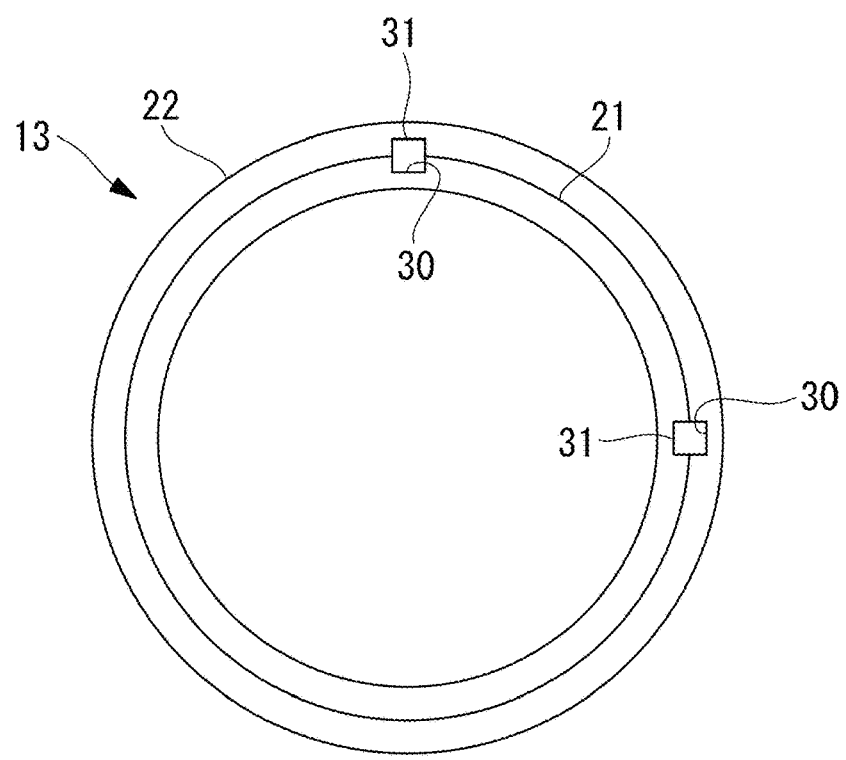
FIG. 4 is a transverse sectional view showing a hollow shaft according to another modification of the robot drive unit shown in FIG. 1.

Instead of engagement of the recessed section 28 and the protruding section 29, as shown in FIG. 4, keys 31 may be disposed, in an inserted manner, in key grooves 30 that are provided in the fitting surfaces of the shaft body 21 and the collar 22. The number of the keys 31 may be one, or a plurality of the keys 31 may be disposed at intervals in the circumferential direction. It is also possible to adopt a spline joint or a serration joint between the shaft body 21 and the collar 22.

Figure 5:
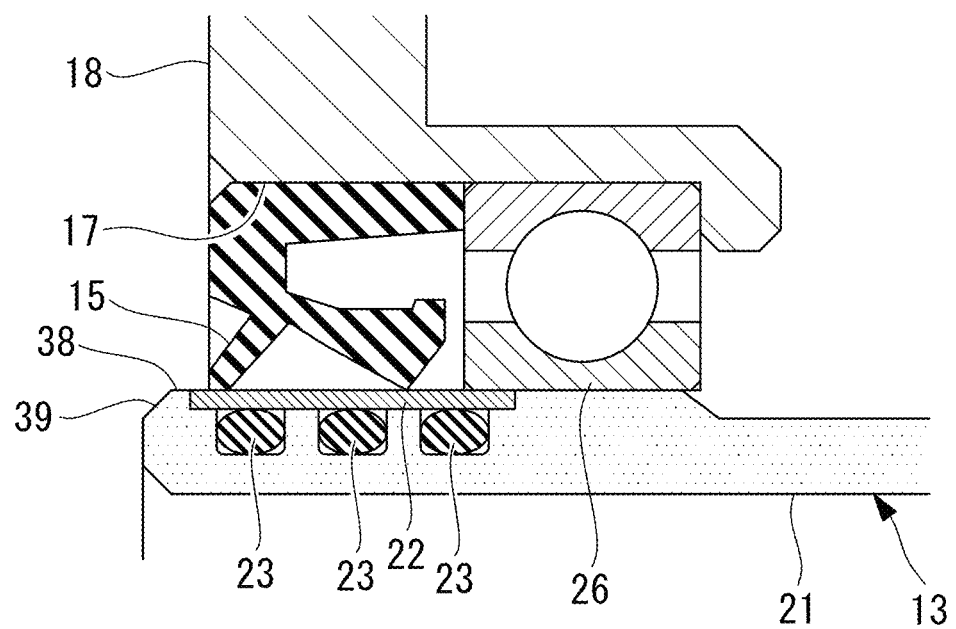
FIG. 5 is a partial longitudinal sectional view showing, in an enlarged manner, a distal end section of a hollow shaft according to still another modification of the robot drive unit shown in FIG. 1.

Although an example case in which the collar 22 is assembled on the shaft body 21 by the snap-fit method is shown, instead of this, the collar 22 and the shaft body 21 may be integrally formed through insert molding. Although an example case in which the single sealing member 23, such as an O-ring, is disposed between the shaft body 21 and the collar 22 is shown, instead of this, as shown in FIG. 5, it is also possible to dispose a plurality of the sealing members 23, such as O-rings, in the longitudinal direction (the direction of the axis A) of the shaft body 21. Accordingly, the friction between the shaft body 21 and the collar 22 is increased, thus making it possible to improve the locking effect.

Figure 6:
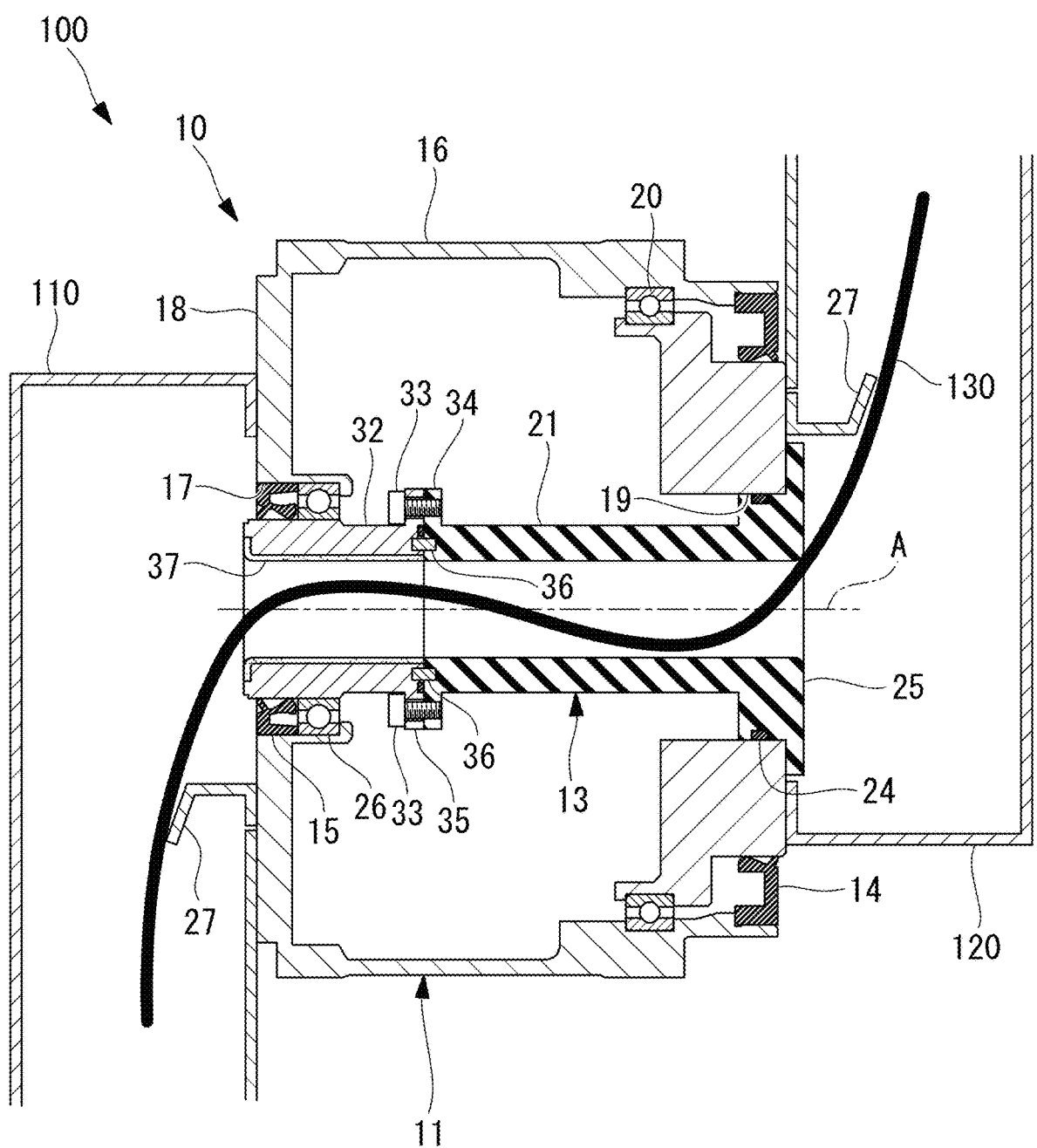
FIG. 6 is a partial longitudinal sectional view showing still another modification of the robot drive unit shown in FIG. 1.

In this embodiment, although the collar 22, which covers part of the outer circumferential surface of the shaft body 21, is shown as an example of the contact-surface member, instead of this, as shown in FIG. 6, the contact-surface member may also be formed of a cylindrical contact-surface member 32 that is connected to the distal end section of the shaft body 21 and that extends the shaft body 21 in the direction along the axis A. Flanges 34 and 35 that are made to abut against each other in the direction along the axis A and that are brought into close contact with each other by means of bolts 33 are provided at the distal end of the shaft body 21 and the base end of the contact-surface member 32, respectively. The shaft body 21 and the contact-surface member 32 are positioned by means of positioning pins 36. It is necessary to insert a sealing member between joint surfaces of the shaft body 21 and the contact-surface member 32 to provide a sealing function.

In this case, it is preferred that the contact-surface member 32 be made of a material having a higher surface hardness than the shaft body 21, e.g., iron, and an inner circumferential surface thereof be covered with a liner (covering member) 37 that is made of a high-molecular compound, such as tetrafluoroethylene. Accordingly, the shaft body 21 and the contact-surface member 32 are integrated, thus making it possible to more reliably prevent positional deviation. The liner 37 reduces wear caused by the friction of the inner side of the contact-surface member 32 with respect to the wire-shaped body 130, thus making it possible to maintain the soundness of the wire-shaped body 130.

In this embodiment, although the hollow shaft 13 is fixed to the output shaft member 12, and the gap between the hollow shaft 13 and the housing 11 is sealed by means of the second sealing member 15 in a rotatable manner, instead of this, it is also possible to fix the hollow shaft 13 to the end plate 18 of the housing 11 and to seal the gap between the hollow shaft 13 and the output shaft member 12 by means of the second sealing member 15 in a rotatable manner. As the first member 110 and the second member 120, it is also possible to adopt arbitrary joint component parts that constitute the robot 100 of an arbitrary type. For example, in a case of a vertical articulated robot, the present invention may be applied to a joint between a rotating part and a first arm, a joint between the first arm and a second arm, etc.

As a result, the following aspect is derived from the above described embodiment. According to one aspect, the present invention provides a robot drive unit that is provided with a first member and a second member that are relatively rotated about a predetermined axis, the robot drive unit including: a housing that is fixed to the first member; an output shaft member that is supported by the housing so as to be capable of rotating about the axis and that is fixed to the second member; a hollow shaft having cylindrical shape and that is disposed coaxially with the axis, that is fixed to one of the housing and the output shaft member, and that is supported by the other one of the housing and the output shaft member so as to be capable of rotating about the axis; and rotating-body sealing members that respectively seal a gap between the housing and the output shaft member and a gap between the hollow shaft and the other one of the housing and the output shaft member, while allowing relative rotation about the axis, wherein the hollow shaft is provided with: a shaft body that is made of a non-ferrous material; and a contact-surface member that is fixed to the shaft body, that is made of a material having a higher surface hardness than the shaft body, and that forms a contact surface to be in contact with the corresponding rotating-body sealing member.

According to this aspect, the output shaft member, which is fixed to the second member, is rotationally driven with respect to the housing, which is fixed to the first member, thereby making it possible to relatively rotate the first member and the second member about the predetermined axis. In this case, the hollow shaft having cylindrical shape, which is disposed coaxially with the axis of the relative rotation, is fixed to one of the first member and the second member, and is supported by the other one of the first member and the second member so as to be capable of rotating about the axis, thus allowing rotation of the output shaft member about the axis with respect to the housing and forming, inside the hollow shaft, a space that penetrates therethrough in the vicinity of the axis in the direction along the axis.

Therefore, by using this space, it is possible to lay a wire-shaped body, such as a cable, from the inside of the first member to the inside of the second member, the first member and the second member being rotated relative to each other. Then, a space that is surrounded by the housing, the output shaft member, and the hollow shaft is sealed by means of the rotating-body sealing members, which are disposed between the housing and the output shaft member and between the hollow shaft and the other one of the housing and the output shaft member. Specifically, a speed reduction mechanism etc. lubricated with a lubricant can be disposed in this surrounded space.

In this case, the shaft body, which constitutes the hollow shaft, is made of a non-ferrous material, such as a resin or a light metal, e.g., aluminum, thereby making it possible to achieve weight reduction of the robot. Then, even if the surface hardness is reduced by using the non-ferrous material, the contact surface, which is brought into contact with the rotating-body sealing member, is formed of a contact-surface member that is made of a material having a higher surface hardness than the non-ferrous material, thereby making it possible to achieve high sealing performance. Furthermore, the hollow shaft is made of a resin, thereby making it possible to reduce the friction against the wire-shaped body etc. passing through a hollow hole thereof and to maintain the soundness of the wire-shaped body.

The above-described aspect may further include a bearing that supports the hollow shaft so as to be rotatable with respect to the other one of the housing and the output shaft member. With this configuration, the bearing compensates for a reduction in hardness of the hollow shaft, which is caused by making the shaft body of a non-ferrous material, thereby making it possible to prevent a reduction in sealing performance caused by a core shift of the hollow shaft.

In the above-described aspect, the bearing may be disposed at such a position as to overlap with at least part of the contact-surface member in a direction along the axis. With this configuration, the bearing, which supports the rotation of the hollow shaft, directly supports the contact-surface member, thereby making it possible to more reliably prevent a shift of the contact surface with respect to the sealing member and to ensure stable sealing performance.

In the above-described aspect, the contact-surface member may be formed into a cylinder shape so as to cover the entire circumference of part of an outer circumferential surface of the shaft body in a direction along the axis. With this configuration, the contact-surface member is formed to be relatively thin, thus making it possible to achieve weight reduction.

The above-described aspect may further include a sealing member that seals a gap between an inner circumferential surface of the contact-surface member and the outer circumferential surface of the shaft body. With this configuration, it is possible to prevent a situation in which a lubricant etc. therein leaks by passing through a gap between the inner circumferential surface of the contact-surface member and the outer circumferential surface of the shaft body. In the above-described aspect, a plurality of the sealing members may be arranged in the direction of the axis.

In the above-described aspect, the contact-surface member may be formed into a cylinder shape and may be disposed at a position so as to extend the distal end of the shaft body in a direction along the axis. With this configuration, weight reduction can be achieved, compared with a case in which the entirety of the hollow shaft is made of iron.

In the above-described aspect, the inner circumferential surface of the contact-surface member may be covered with a covering member that is made of a high-molecular compound. With this configuration, the covering member, which covers the inner circumferential surface of the contact-surface member, reduces the friction with the wire-shaped body etc., which passes through the inside of the hollow hole of the hollow shaft, thereby making it possible to maintain the soundness of the wire-shaped body.

In the above-described aspect, the shaft body may be made of a non-ferrous material, and the non-ferrous material is a material lighter than iron. The shaft body may be formed to be hollow.

The contact-surface member may be fixed to the shaft body so as not to move in a longitudinal direction of the shaft body with respect to the shaft body.

According to another aspect, the present invention provides a robot including: a first member and a second member that are relatively rotated about a predetermined axis; and one of the above-described robot drive units, which rotationally drives the second member relatively to the first member.

According to another aspect, the present invention provides a assembling method of a robot drive unit including a robot drive unit comprising a housing, a shaft body that is relatively rotated with respect to the housing, rotating-body sealing members that is provided in the housing, a contact-surface member that is provided on the shaft body and that contact with the rotating-body sealing members, and a sealing member that seals a gap between the shaft body and the contact-surface member, wherein the contact-surface member connected to the shaft body is integrally inserted into the rotating-body sealing members with the shaft body.

The invention claimed is:
1. A robot drive unit comprising:
a housing;
a shaft body that is relatively rotated with respect to the housing;

a rotating-body sealing member that is provided in the housing;

a contact-surface member that is provided on the shaft body and that contacts with the rotating-body sealing member; and a sealing member that seals a gap between the shaft body and the contact-surface member.

2. The robot drive unit according to claim 1, wherein the rotating-body sealing member seals the gap while allowing relative rotation of the shaft body with respect to the housing.

3. The robot drive unit according to claim 1, further comprising a bearing that supports the shaft body so as to be rotatable with respect to the housing.

4. The robot drive unit according to claim 3, wherein the bearing is disposed at such a position so as to overlap with at least part of the contact-surface member in a direction along an axis of the shaft body.

5. The robot drive unit according to claim 1, wherein the contact-surface member is formed into a cylinder shape so as to cover the entire circumference of part of an outer circumferential surface of the shaft body in a direction along an axis of the shaft body.

6. The robot drive unit according to claim 5, wherein the sealing member seals a gap between an inner circumferential surface of the contact-surface member and the outer circumferential surface of the shaft body.

7. The robot drive unit according to claim 6, wherein a plurality of the sealing members are arranged in the direction of the axis.

8. The robot drive unit according to claim 1, wherein the contact-surface member is formed into a cylinder shape and is disposed at a position so as to extend the distal end of the shaft body in a direction along an axis of the shaft body.

9. The robot drive unit according to claim 8, wherein the inner circumferential surface of the contact-surface member is covered with a covering member that is made of a high-molecular compound.

10. The robot drive unit of claim 1, wherein the contact-surface member is configured to be integrally inserted into the rotating-body sealing member with the shaft body.

11. The robot drive unit according to claim 1, wherein the shaft body is made of a non-ferrous material, and the non-ferrous material is a material lighter than iron.

12. The robot drive unit according to claim 1, wherein the shaft body is formed to be hollow.

13. The robot drive unit according to claim 1, wherein the contact-surface member is fixed to the shaft body so as not to move in a longitudinal direction of the shaft body with respect to the shaft body.

14. The robot drive unit according to claim 1, wherein the contact-surface member is made of a material having a higher surface hardness than the shaft body.

15. The robot drive unit according to claim 1, wherein the rotating-body sealing member and the sealing member are separate.

16. A robot comprising:

the first member and the second member, which are relatively rotated about an axis of the shaft body; and a robot drive unit comprising a housing;

a shaft body that is relatively rotated with respect to the housing;

a rotating-body sealing member that is provided in the housing;

a contact-surface member that is provided on the shaft body and that contacts with the rotating-body sealing member; and a sealing member that seals a gap between the shaft body and the contact-surface member, which rotationally drives the second member relatively to the first member.

17. The robot of claim 16, wherein the contact-surface member is configured to be integrally inserted into the rotating-body sealing member with the shaft body.

18. A seal structure for a robot drive unit comprising a housing, and a shaft body that is relatively rotated with respect to the housing, the seal structure comprising:

a rotating-body sealing member provided in the housing;

a contact-surface member provided on the shaft body, the contact-surface member contacting with the rotating-body sealing member; and a sealing member that seals a gap between the shaft body and the contact-surface member.

19. The seal structure of claim 18, wherein the contact-surface member is configured to be integrally inserted into the rotating-body sealing member with the shaft body.

20. An assembling method of a robot drive unit comprising a housing, a shaft body that is relatively rotated with respect to the housing, a rotating-body sealing member that is provided in the housing, a contact-surface member that is provided on the shaft body and that contact with the rotating-body sealing member, and a sealing member that seals a gap between the shaft body and the contact-surface member, comprising integrally inserting the contact-surface member connected to the shaft body into the rotating-body sealing member with the shaft body.

\* \* \* \* \*